United States Patent [19]

Vaahs et al.

[11] Patent Number: 5,032,663
[45] Date of Patent: Jul. 16, 1991

[54] CHLORINE-CONTAINING SILAZANE POLYMERS, PROCESS FOR THEIR PREPARATION, CERAMIC MATERIALS CONTAINING SILICON NITRIDE WHICH CAN BE PREPARED FROM THEM, AND THEIR PREPARATION

[75] Inventors: Tilo Vaahs, Kelkheim; Marcellus Peuckert; Martin Brück, both of Hofheim am Taunus, all of Fed. Rep. of Germany

[73] Assignee: Hoechst Aktiengesellschaft, Frankfurt am Main, Fed. Rep. of Germany

[21] Appl. No.: 444,025

[22] Filed: Nov. 30, 1989

[30] Foreign Application Priority Data

Dec. 3, 1988 [DE] Fed. Rep. of Germany ....... 3840777

[51] Int. Cl.$^5$ .............................................. C08G 77/12
[52] U.S. Cl. .................................... 528/31; 528/37; 528/35; 528/34; 528/33; 525/477; 525/478
[58] Field of Search .................. 525/477, 478; 528/37, 528/35, 34, 33, 31

[56] References Cited

U.S. PATENT DOCUMENTS

| 4,397,828 | 8/1983 | Seyferth et al. | 423/344 |
| 4,482,669 | 11/1984 | Seyferth et al. | 524/442 |
| 4,535,007 | 8/1985 | Cannady | 525/477 |
| 4,540,803 | 9/1985 | Cannady | 556/412 |
| 4,543,344 | 9/1985 | Cannady | 501/92 |
| 4,595,775 | 6/1986 | Arkles | 556/409 |
| 4,847,345 | 7/1989 | Takamizawa et al. | 528/35 |
| 4,861,532 | 8/1989 | Haluska | 264/65 |
| 4,869,854 | 9/1989 | Takeda et al. | 264/22 |
| 4,931,513 | 6/1990 | Gerdau et al. | 524/474 |

FOREIGN PATENT DOCUMENTS 8665687 6/1987 Australia .
586050 6/1989 Australia .

OTHER PUBLICATIONS

Wills, R. R. et al., Ceramic Bulletin 62:904-915 (1983).

Primary Examiner—Paul R. Michl
Assistant Examiner—Karen A. Hellender

[57] ABSTRACT

The invention relates to novel chlorine-containing silazane polymers, to their preparation, their further processing to ceramic material containing silicon nitride, and this material itself. In order to prepare the chlorine-containing silazane polymers, oligosilazanes of the formula (I)

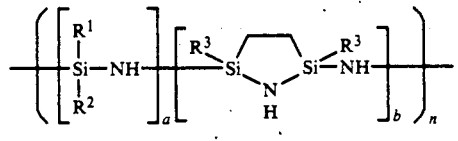

in which $a > 0$, $b \geq 0$ and n is about 2 to about 12, are reacted with at least one of the chlorosilanes $Cl_2R^4Si-CH_2-CH_2-SiR^4Cl_2$, $Cl_3Si-CH_2-CH_2-SiR^5Cl_2$, $R^6SiCl_3$ or $R^7SiHCl_2$ at 30° C. to 300° C., where, independently of one another, $R^1$ and $R^2$ = H, $C_1$-$C_6$-alkyl or $C_2$-$C_6$-alkenyl,
$R^3$, $R^4$, $R^5$, $R^6$ and $R^7$ = $C_1$-$C_6$-alkyl or $C_2$-$C_6$-alkenyl and where if b=0 the reaction with $R^7SiHCl_2$, if $R^7$ = $C_1$-$C_6$-alkyl and none of the other chlorosilanes is present, is to be excluded.

The chlorine-containing silazane polymers according to the invention can be converted by reaction with ammonia into polysilazanes, which in their turn can be pyrolyzed to form ceramic materials containing silicon nitride.

23 Claims, No Drawings

CHLORINE-CONTAINING SILAZANE POLYMERS, PROCESS FOR THEIR PREPARATION, CERAMIC MATERIALS CONTAINING SILICON NITRIDE WHICH CAN BE PREPARED FROM THEM, AND THEIR PREPARATION

DESCRIPTION

The invention relates to novel chlorine-containing silazane polymers, to their preparation, their further processing to ceramic material containing silicon nitride, and this material itself.

The pyrolysis of polysilazanes to ceramic material containing silicon nitride has already been described in the literature (R. R. Wills et al., Ceramic Bulletin, Vol. 62 (1983), 904–915).

As a rule, in order to prepare polysilazanes, chlorosilanes are used as starting materials and these are reacted with ammonia or primary or secondary amines (U.S. Pat. No. 4,540,803, U.S. Pat. No. 4,543,344, U.S. Pat. No. 4,595,775, U.S. Pat. No. 4,397,828, U.S. Pat. No. 4,482,669).

The present invention provides novel starting materials for polysilazanes, namely chlorine-containing silazane polymers.

The invention relates to a process for the preparation of chlorine-containing silazane polymers, which comprises reacting oligosilazanes of the formula (I)

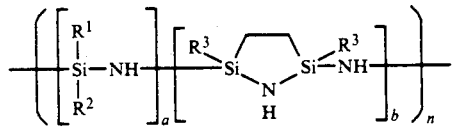

in which $a > 0$, $b \geq 0$ and n is about 2 to about 12, with at least one of the chlorosilanes $Cl_2R^4Si-CH_2-CH_2-SiR^4Cl_2$, $Cl_3Si-CH_2-CH_2-SiR^5Cl_2$, $R^6SiCl_3$ or $R^7SiHCl_2$ at 30° C. to 300° C., where, independently of one another, $R^1$ and $R^2 = H$, $C_1$-$C_6$-alkyl or $C_2$-$C_6$-alkenyl, $R^3$, $R^4$, $R^5$, $R^6$ and $R^7 = C_1$-$C_6$-alkyl or $C_2$-$C_6$-alkenyl and where if $b=0$ the reaction with $R^7SiHCl_2$, if $R^7 = C_1$-$C_6$-alkyl and none of the other chlorosilanes is present, is to be excluded. It is preferable to select $a = 0.85$–$0.98$ and $b = 0.02$–$0.15$. The chlorine-containing silazane polymers prepared according to the invention are alternatively also designated below as polymeric chlorosilazanes. The oligosilazanes used as starting materials may be obtained, by reacting a mixture of chlorosilanes of the formulae $R^1R^2SiCl_2$ and $Cl_2R^3Si-CH_2CH_2-SiR^3Cl_2$ in which $R^1$ to $R^3$ have the above meaning, in n-pentane at $-70°$ to $+100°$ C. with an excess of $NH_3$, in a manner analogous to that described in U.S. Pat. No. 4,482,669 for methyldichlorosilane (cf. particularly columns 4, 5, 7, 8 in the latter patent). Generally, from this reaction, a mixture of linear and cyclic oligomers having different chain lengths n is formed. $Cl_2R^3Si-CH_2CH_2-SiR^3Cl_2$ is accessible by hydrosilylation from $R^3HSiCl_2$ and ethyne.

Preferably, $R^1$ and $R^2 = H$, $C_1$-$C_3$-alkyl or $C_2$-$C_3$-alkenyl, and $R^3$, $R^4$, $R^5$, and $R^7 = C_1$-$C_3$-alkyl or $C_2$-$C_3$-alkenyl, where the said radicals can be identical or different. The case in which $R^1 = H$, $R^2 = R^3 = R^4 = R^5 = R^7 = CH_3$ and $R^6 = CH_3$ or vinyl is particularly preferred.

The reaction of oligosilazanes of the formula (I) in which $b=0$, (i.e. thus of oligosilazanes of the formula $[R^1R^2-Si-NH]_n$ where n is about 2 to about 12) with chlorosilanes of the formula $R^7SiHCl_2$ for the case where $R^7 = C_1$-$C_6$-alkyl and none of the other chlorosilanes $Cl_2R^4Si-CH_2CH_2-SiR^4Cl_2$, $Cl_3Si-CH_2CH_2-SiR^5Cl_2$ and $R^6SiCl_3$ are simultaneously present has already been described in the German Patent Application P 37 33 727.0 and is therefore not claimed in the present application.

The molar ratio of the reactants chlorosilane:monomer unit of the oligosilazane ($n=1$) during the reaction to form the polymeric chlorosilazane is preferably about 0.1:1 to about 1.5:1, particularly about 0.1:1 to about 0.7:1.

In order to bring the reactants into reaction with each other the oligosilazanes are preferably initially introduced and at least one of the chlorosilanes mentioned is added. Since the reaction is exothermic, the temperature is preferably initially kept at 30° to 50° C. when adding the reactants together. The reaction mixture is subsequently heated to temperatures of 100° to 300° C., preferably to 120° to 250° C.

The $NH_3$ formed as a by-product partially escapes during the reaction. Once the reaction has reached completion, the remaining readily volatile compounds are generally removed from the reaction vessel by applying a vacuum.

The $NH_4Cl$ which is also formed during the reaction sublimes for the most part out of the reaction mixture in the course of the reaction. Any residual $NH_4Cl$ can be separated off from the polymeric chlorosilazane prepared according to the invention by extraction with an inert organic solvent, such as n-hexane, toluene or ether.

The duration of the reaction is governed by the rate of heating and the reaction temperature. Generally, a reaction time of 3 to 7 hours is sufficient.

It is also possible to carry out the reaction in an organic solvent. Suitable solvents are those which are inert towards the reactants and have a sufficiently high boiling point, that is to say, for example, saturated aliphatic or aromatic hydrocarbons such as n-decane, Decalin, xylene or toluene, chlorinated hydrocarbons such as chlorobenzene, or ethers such as dibenzyl ether or diethylene glycol diethyl ether. If a solvent is used in which the $NH_4Cl$ formed is insoluble, the latter can be separated off by filtration. The polymeric chlorosilazanes according to the invention are then obtained by distilling off the solvent under reduced pressure.

If appropriate, the process may also be carried out under reduced pressure. It is also possible to operate at pressures in the range of 1 to 10 atmospheres.

The process can also be designed to operate continuously.

The novel polymeric chlorosilazanes prepared have the formula (II)

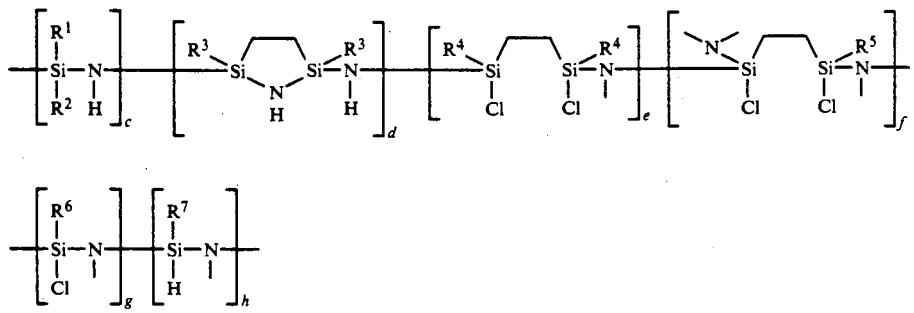

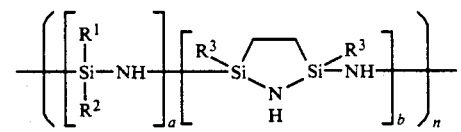

in which the free valencies of the nitrogen atoms are saturated by H atoms or silyl radicals R*SiX-N<(X=H,Cl,N<, CH$_2$CH$_2$Si≡←) and in which c, d, e, f, g and h denote the mole fractions of the individual structural units and, independently of one another, $R^1$ and $R^2$=H, $C_1$-$C_6$-alkyl or $C_2$-$C_6$-alkenyl $R^4$, $R^5$, $R^6$ and $R^6$=$C_1$-$C_6$-alkyl or $C_2$-$C_6$-alkenyl $R^7$=$C_1$-$C_6$-alkyl or $C_2$-$C_6$-alkenyl if at least one of the indices d, e, f and g>0, and $R^7$=$C_2$-$C_6$-alkenyl if d=e=f=g=0.

The present invention also relates to these novel polymeric chlorosilazanes. In these compounds, preferably $R^1$ and $R^2$=H, $C_1$-$C_3$-alkyl or $C_2$-$C_3$-alkenyl, and $R^3$, $R^4$, $R^5$, $R^6$ and $R^7$=$C_1$-$C_3$-alkyl or $C_2$-$C_3$-alkenyl. A particularly preferred case is that in which $R^1$=H, $R^2$=$R^3$=$R^4$=$R^5$=$R^7$=CH$_3$ and $R^6$=CH$_3$ or vinyl. Here, the above definition of $R^7$ is to be found.

The polymeric chlorosilazanes have a net-like structure. Whether the mole fractions c to h assume positive values or the value 0 depends on the oligosilazanes of the general formula (I) used in the reaction with the chlorosilanes:

If (I) is reacted only with $R^6$SiCl$_3$, then e=f=h=0; c, d and g assume positive values.

If (I) is reacted only with $R^7$HSiCl$_2$, then e=f=0; c, d, g and h assume positive values, and $R^6$=$R^7$.

If (I) is reacted only with Cl$_2$R$^4$Si—CH$_2$CH$_2$—SiR$^4$Cl$_2$, then f=g=h=0; c, d and e assume positive values.

If (I) is reacted with a mixture of Cl$_3$Si—CH$_2$CH$_2$—SiR$^5$Cl$_2$ and $R^6$SiCl$_3$, then e=h=0; c, d, f and g are positive.

The particular values of c to h in each case can be determined by integration of the $^1$H-NMR spectra and by elementary analysis.

Generally, c+d is 0.3 to 0.9 and c>0 and d≧0; generally, e, f, g and h are of the order of 0.01 to 0.4. Here, c+d+e+f+g+h=1.

Preferred polymeric chlorosilazanes are those in which c and d are 0.3 to 0.8, particularly 0.3 to 0.5. The preferred values for e, f, g and h are 0.01 to 0.3, particularly 0.01 to 0.2. These values can be checked by the analytical methods mentioned. The preferred values for c, d, e, f, g and h which have just been mentioned have proved particularly advantageous when a fiber is to be produced as the end product of the pyrolysis (after conversion of the polymeric chlorosilazanes into polysilazanes).

The present invention also relates to polymeric chlorosilazanes which are obtainable by reacting oligosilazanes of the formula (I)

in which a>0, b≧0 and n is about 2 to about 12, with at least one of the chlorosilanes Cl$_2$R$^4$Si—CH$_2$—CH$_2$—SiR$^4$Cl$_2$, Cl$_3$Si—CH$_2$—CH$_2$—SiR$^5$Cl$_2$, $R^6$SiCl$_3$ or $R^7$SiHCl$_2$ at 30° C. to 300° C., where, independently of one another, $R^1$ and $R^2$=H, $C_1$-$C_6$-alkyl or $C_2$-$C_6$-alkenyl, $R^3$, $R^4$, $R^5$, $R^6$ and $R^7$=$C_1$-$C_6$-alkyl or $C_2$-$C_6$-alkenyl and where if b=0 the reaction with $R^7$SiHCl$_2$, if $R^7$=$C_1$-$C_6$-alkyl and none of the other chlorosilanes is present, is to be excluded.

In these compounds, preferably $R^1$ and $R^2$=H, $C_1$-$C_3$-alkyl or $C_2$-$C_3$-alkenyl, and $R^3$, $R^4$, $R^5$, $R^5$, $R^6$ and $R^7$=$C_1$-$C_3$-alkyl or $C_2$-$C_3$-alkenyl. The case in which $R^1$=H, $R^2$=$R^3$=$R^4$=$R^5$=$R^7$=CH$_3$ and $R^6$=CH$_3$ or vinyl is particularly preferred.

The novel polymeric chlorosilazanes can be converted into polysilazanes by reaction with ammonia ("ammonolysis"), and the polysilazanes can in turn be converted by pyrolysis into ceramic material containing silicon nitride.

The ammonolysis can be carried out in liquid NH$_3$. However, it is advantageous to carry out the ammonolysis in an organic solvent. All solvents which are inert towards the polymeric chlorosilazanes are suitable. Preferred solvents are those in which the ammonium chloride obtained as a by-product has low solubility and from which it can be easily separated off, such solvents being, for example, ethers, aliphatic and aromatic hydrocarbons and chlorinated hydrocarbons. In the ammonolysis, the reactants can be fed into the reaction vessel in any desired order. However, it is usually advantageous initially to introduce the polymeric chlorosilazane in solution and to pass in gaseous ammonia or to add liquid ammonia. If the polymeric chlorosilazanes according to the invention have been prepared in a suitable organic solvent, the ammonolysis can be carried out in this solvent without prior separation of the NH$_4$Cl. The ammonolysis is preferably carried out with an excess of NH$_3$, in order to ensure that the reaction is complete and the end products are as substantially free from chlorine as possible. Generally, double the stoichiometric amount is sufficient for this purpose.

Generally, the operation is carried out at a temperature of about −50° to +100° C., preferably at −20° to +30° C., particularly at room temperature (where ice is used for cooling). However, it is also possible to operate above room temperature, for example at the boiling point of the solvent used, or below room temperature, for example at −33° C. when liquid NH₃ is used.

After ammonolysis is complete, the excess of NH₃ is removed if necessary and the ammonium chloride which has resulted is filtered off. In order to increase the yield, the precipitate can be washed with one of the above-mentioned organic solvents. The polysilazanes are obtained directly as white powders after distilling off the solvent under reduced pressure. The polysilazanes are soluble in the above organic solvents, so that these can be used not only for coating surfaces but also for producing fibers.

By pyrolysis in an inert atmosphere of nitrogen or argon at temperatures of 800° to 1200° C., the polysilazanes can be pyrolysed to form amorphous, dense materials which are composed essentially of Si, N and C and may also contain traces of H and O. At pyrolysis temperatures above 1200° C., for example in the range from 1200° C. to 1400° C., partially amorphous, microcrystalline ceramic materials are produced, which contain $\alpha$—$Si_3N_4$ as a crystalline phase.

A particular advantage is that, before pyrolysis, the polysilazanes can be shaped into three-dimensional shaped articles by various processes.

An important method of shaping is the drawing of fibers. By this method, fibers can be drawn from highly viscous solutions of the polysilazane in solvents such as toluene, THF or hexane. Fiber-drawing is advantageously carried out using spinning dies 80 to 150 μm in diameter. The thread is thinned out by subsequent stretching, so that after the pyrolysis, a very strong thread, 2 to 20 μm, in particular 5 to 15 μm, in diameter is produced. The fibers which are produced by subsequent pyrolysis are used as mechanical reinforcing inlays in fiber-reinforced aluminum, aluminum alloys and ceramic components.

A further important processing possibility with polysilazanes is the production of impervious, strongly adhering, amorphous or microcrystalline ceramic coatings on metals, in particular on steels. The coating is carried out with the aid of a solution of the polysilazane in organic solvents such as toluene, THF or hexane. The pyrolytic conversion into an amorphous or microcrystalline layer is carried out in the same temperature range of from 800° to 1200° C. or 1200° to 1400° C. under an inert gas, as described above in the case of three-dimensional shaped articles.

Due to their excellent adhesion, great hardness and surface quality, the ceramic coatings are particularly suitable for the surface treatment of machine components which are subject to mechanical and chemical stress.

Moreover, it is possible to pyrolyse the polysilazanes described above in an atmosphere of NH₃ instead of in an inert gas, with an equally high ceramic yield of 70 to 90%. In this case, a glass-clear, colorless material results which is virtually carbon-free. When pyrolysis is carried out in NH₃ at 1000° C. or above, the carbon content is below 0.5% by weight. Depending on the pyrolysis temperature, the pyrolysis product is composed of virtually pure amorphous silicon nitride (pyrolysis below 1200° C.) or crystalline $Si_3N_4$ (pyrolysis above 1200° C., in particular above 1300° C.). Pyrolysis in NH₃ can be employed for all those shaped articles produced by the shaping processes described above, namely articles, fibers and coatings shaped from powders.

Accordingly, the invention further relates to a process for the preparation of a ceramic material containing silicon nitride, which comprises reacting the abovementioned polymeric chlorosilazanes, which we characterized by their formula or their process of preparation, with ammonia at −50° to +100° C. and pyrolysing the polysilazane thus formed in an inert atmosphere of nitrogen or argon or in an atmosphere of ammonia at 800° to 1400° C.

Preferably, however, the conversion of the polymeric chlorosilazanes into ceramic material containing silicon nitride is carried out in such a way that the polysilazanes formed as intermediates are not isolated. In this case, the polymeric chlorosilazanes are preferably reacted with gaseous ammonia and the resulting reaction mixture is pyrolysed in an atmosphere of ammonia.

Accordingly, the present invention further relates to a process for the preparation of ceramic material containing silicon nitride, which comprises reacting the abovementioned polymeric chlorosilazanes, which are characterized by their formula or their process of preparation, with ammonia at 0° to +300° C. and pyrolysing the reaction product in an atmosphere of NH₃ at 800°–1400° C.

EXAMPLES

EXAMPLE 1

Preparation of a polymer of the formula (II) by reaction of an oligomer of the formula (I) (a=0.67, b=0.33 and $R^1$=H and $R^2$=$R^3$=CH₃) with CH₃SiCl₃.

a. Preparation of the Oligomer 60 ml (66.9 g, 0.58 mol) of CH₃SiHCl₂ and 60 ml (72.0 g, 0.28 mol) of Cl₂CH₃Si—CH₂CH₂—SiCH₃Cl₂ are dissolved in 1.5 l of absolute THF in a 2 litre four-necked flask fitted with a stirrer device, cooling and gas inlet device, and mixed. Gaseous ammonia was passed into this mixture at a rate such that the temperature of the reaction mixture remained between 0° C. and 10° C. As soon as saturation had been reached, i.e. all of the SiCl groups had been substituted by NH groups, the reaction mixture was allowed to thaw, in order subsequently to separate off, under inert gas, the ammonium chloride which had been formed during the reaction. The filtrate was freed from THF and the other volatile constituents under a reduced pressure of down to about 10 mbar and at about 40° C. The solvent-free oligosilazane remained behind as a clear, highly mobile oil (62.7 g).

b. Preparation of the Polymer

The oligosilazane was dissolved in 150 ml of toluene and 47 ml (59.8 g, 0.4 mol) of CH₃SiCl₃ were carefully added. The internal temperature increased to 52° C. during the addition. The mixture was then heated under reflux for 2 h, during which a colorless precipitate formed. The solvent was then distilled at reduced pressure into a cold trap maintained at −78° C., the temperature of the oil bath being raised by 10° C. every 15 min and the pressure inside the flask being reduced somewhat, so that finally a pressure 0.1 mbar was reached at 220° C. During this operation some of the reaction mixture sublimed into the cooler parts of the vessel, and a clear melt remained behind. On cooling, the latter became more viscous and finally solid, and at 20° C. the resulting substance had a glass-like brittleness and clear transparency.

Yield: 45.6 g

| $^1$H-NMR data: | |
|---|---|
| SiCH$_3$ + SiCH$_2$CH$_2$Si + NH | δ = 0.0–2.0 ppm (broad), intensity 20 |
| SiH | δ = 4.5–5.2 ppm (broad), intensity 0.9 |

Analytical data: Found: Si 36.0%, N,16.0%, Cl, 19.9%, 0<0.3% Calculated: Si 37.2%, N,18.6%, Cl, 17.1%, C,21.1%, H 4.8%

The polymer had the formula (II) in which $R^1$=H and $R^2$=$R^3$=$R^6$=CH$_3$:

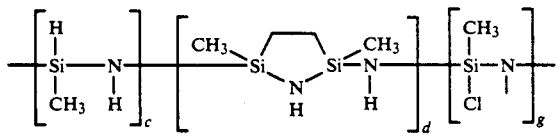

with the values: c=0.38, d=0.19, g=0.43, e=f=h=0.

EXAMPLE 2

Preparation of a polymer of the formula (II) by reaction of an oligomer of the formula (I) (a=0.75, b=0.25 and $R^1$=H and $R^2$=$R^3$=CH$_3$) with 1,2-bis(dichloromethylsilyl)ethane Cl$_2$CH$_3$Si—CH$_2$CH$_2$—SiCH$_3$Cl$_2$. A procedure analogous to Example 1 was followed.

a. Preparation of the Oligosilazane

Chlorosilanes used: 86.3 g (0.75 mol, 77.4 ml) of CH$_3$SiHCl$_2$ 64.0 g (0.25 mol, 52.2 ml) of Cl$_2$CH$_3$Si—CH$_2$CH$_2$—SiCH$_3$Cl$_2$ Preparation of the Polysilazane The oligosilazane was reacted with 64 g (0.25 mol, 52 ml) of Cl$_2$CH$_3$Si—CH$_2$CH$_2$—SiCH$_3$Cl$_2$.

Yield: 69.3 g

| $^1$H-NMR data: | |
|---|---|
| SiCH$_3$ + SiCH$_2$CH$_2$Si + NH = | δ = 0.0–2.1 ppm (broad), intensity 14.4 |
| SiH | δ = 4.5–5.1 ppm (broad), intensity 0.9 |

Analytical data: Found: Si, 35.3%, N, 16.1%, Cl, 17.1%, 0<0.3%. Calculated: Si, 36.5%, N, 15.2%, Cl, 15.9%, C 25.5%, H 6.9%.

The polymer had the formula (II) in which $R^1$=H and $R^2$=$R^3$=$R^4$=CH$_3$:

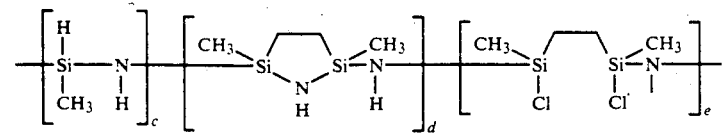

with the values: c=0.54, d=0.21, e=0.25 and f=g=h=0

EXAMPLE 3

Preparation of a polymer of the formula (II) by reaction of an oligomer of the formula (I) (a=0.4, b=0.6 and $R^1$=H and $R^2$=$R^3$=CH$_3$) with a mixture of vinyltrichlorosilane and 1,2-bis(dichloromethylsilyl)ethane. A procedure analogous to Example 1 was followed.

a. Preparation of the Oligosilazane

Chlorosilanes used: 46 g (0.4 mol, 41.3 ml) of CH$_3$SiHCl$_2$ 153.6 g (0.6 mol, 125.2 ml) of Cl$_2$CH$_3$Si—CH$_2$CH$_2$—SiCH$_3$Cl$_2$ b. Preparation of the Polysilazane The oligosilazane was reacted with a mixture of 51.2 g (0.2 mol, 41.7 ml) of Cl$_2$CH$_3$Si—CH$_2$CH$_2$—SiCH$_3$Cl$_2$ and 16.3 g (0.1 mol, 12.8 ml) of vinyl—SiCl$_3$.

Yield: 93.5 g

| $^1$H-NMR data: | |
|---|---|
| SiCH$_3$ + SiCH$_2$CH$_2$Si + NH | δ = 0.0–2.1 ppm (broad), intensity 17.6 |
| SiH | δ = 4.5–4.9 ppm (broad), intensity 0.3 |
| Si vinyl | δ = 5.7–6.2 ppm (broad), intensity 0.5 |

Analytical data: Found: Si, 35.1%, N 18.4%, Cl, 10.7%, 0<0.3% Calculated: Si, 36.8%, N, 17.4%, Cl, 9.4%, C, 30.1%, H, 7.3%

The polymer had the formula (II) in which $R^1$=H, $R^2$=$R^3$=$R^4$=CH$_3$ and $R^6$=vinyl:

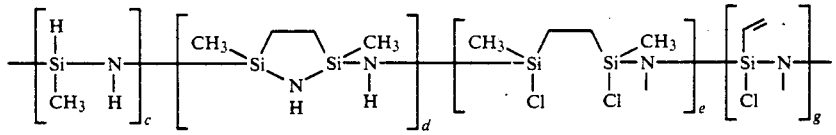

with the values: c=0.22, d=0.56, e=0.12 and f=h=0.

EXAMPLE 4

4. Preparation of a polymer of the formula (II) by reaction of an oligomer of the formula (I) (a=0.5, b=0.5 and $R^1$=$R^2$=$R^3$=CH$_3$) with a mixture of ethyltrichlorosilane and 1-trichlorosilyl-2-dichloromethylsilyl-ethane.

A procedure analogous to Example 1 was followed.

a. Preparation of the Oligosilazane

Chlorosilanes used: 51.6 g (0.4 mol, 48.5 ml) of (CH$_3$)$_2$SiCl$_2$ 102.4 g (0.4 mol, 83.5 ml) of Cl$_2$CH$_3$Si—CH$_2$CH$_2$—SiCH$_3$Cl$_2$ Preparation of the Polysilazane The oligosilazane was reacted with a mixture of 41.5 g (0.15 mol, 34.6 ml) of $Cl_3Si-CH_2CH_2-SiCH_3Cl_2$ and 40.9 g (0.25 mol, 39.9 ml) of $C_2H_5SiCl_3$.

Yield: 69.2 g. $^1H$-NMR data: $SiCH_3+SiCH_2CH_2Si+SiC_2H_5+NH$ $\delta=0.0$-$2.4$ ppm (broad)

Analytical data:
Found: Si, 33.1%, N, 17.4%, Cl, 14.1%, O<0.3%.
Calculated: Si, 34.6%, N, 15.8%, Cl, 13.6%, C 28.4%, H, 6.9%.

The polymer had the formula (II) in which $R^1=R^2=R^3=R^5=CH_3$ and $R^6=C_2H_5$:

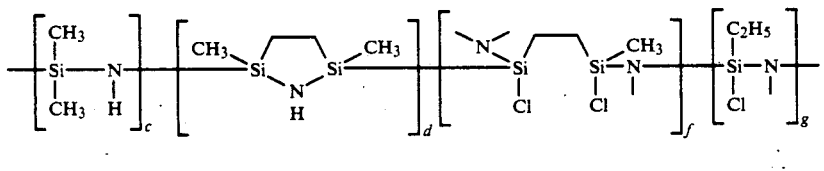

with the values: c=0.27, d=0.39, f=0.13, g=0.43 and e=h=0.

We claim:

1. A process for the preparation of chlorine-containing silazane polymers, which comprises reacting oligosilazanes of the formula (I)

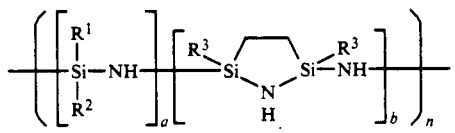

in which a>0, b≧0 and n is about 2 to about 12, with at least one of the chlorosilanes $Cl_2R^4Si-CH_2-CH_2-SiR^4Cl_2$, $Cl_3Si-CH_2-CH_2-SiR^5Cl_2$, $R^6SiCl_3$ or $R^7SiHCl_2$ at 30° C. to 300° C., where, independently of one another, $R^1$ and $R^2$=H, $C_1$-$C_6$-alkyl or $C_2$-$C_6$-alkenyl, $R^3$, $R^4$, $R^5$, $R^6$ and $R^7$=$C_1$-$C_6$-alkyl or $C_2$-$C_6$-alkenyl and if b=0, and no other chlorosilanes are present, then the reaction with $R^7SiHCl_2$, wherein $R^7$=$C_1$-$C_6$-alkyl, is excluded.

2. A process for the preparation of chlorine-containing silazane polymers, which comprises reacting oligosilazanes of the formula (I)

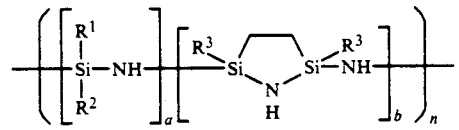

in which a>0, b>0 and n is about 2 to about 12, with at least one of the chlorosilanes $Cl_2R^4Si-CH_2-SiR^4Cl_2$, $Cl_3Si-CH_2-CH_2-CH_2-SiR^5Cl_2$, $R^6SiCl_3$ or $R^7SiHCl_2$ at 30° C. to 300° C., where, independently of one another, $R^1$ and $R^2$=H, $C_1$-$C_6$-alkyl or $C_2$-$C_6$-alkenyl, $R^3$, $R^4$, $R^5$, $R^6$ and $R^7$=$C_1$-$C_6$-alkyl or $C_2$-$C_6$-alkenyl.

3. A process for the preparation of chlorine-containing silazane polymers, which comprises reacting oligosilazanes of the formula

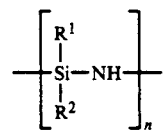

in which n is about 2 to about 12, with at least one of the chlorosilanes $Cl_2R^4Si-CH_2-CH_2-SiR^4Cl_2$, $Cl_3Si-CH_2-CH_2-SiR^5Cl_2$, $R^6SiCl_3$ or $R^7SiHCl_2$ at 30° C. to 300° C., where, independently of one another, $R^1$ and $R^2$=H, $C_1$-$C_6$-alkyl or $C_2$-$C_6$-alkenyl, $R^4$, $R^5$, $R^6$ and $R^7$=$C_1$-$C_6$-alkyl or $C_2$-$C_6$-alkenyl wherein, if no other chlorosilanes are present, the reaction of the oligosilazanes with $R^7SiHCl_2$, where $R^7$=$C_1$-$C_6$-alkyl, is excluded.

4. A process for the preparation of chlorine-containing silazane polymers, which comprises reacting oligosilazanes, which have been obtained by reaction of an excess of ammonia with a mixture of $R^1R^2SiCl_2$ and $Cl_2R^3Si-CH_2CH_2-SiR^3Cl_2$ at 30° C. to 300° C., with at least one of the chlorosilanes $Cl_2R^4Si-CH_2-CH_2-SiR^4Cl_2$, $Cl_3Si-CH_2CH_2-SiR^5Cl_2$, $R^6SiCl_3$ or $R^7SiHCl_2$ at 30° C. to 300° C., where, independently of one another, $R^1$ and $R^2$=H, $C_1$-$C_6$-alkyl or $C_2$-$C_6$-alkenyl and $R^3$, $R^4$, $R^5$, $R^6$ and $R^7$=$C_1$-$C_6$-alkyl or $C_2$-$C_6$-alkenyl.

5. A process for the preparation of chlorine-containing silazane polymers, which comprises reacting oligosilazanes, which have been obtained by reaction of an excess of ammonia with $R^1R^2SiCl_2$ at 30° C. to 300° C., with at least one of the chlorosilanes $Cl_2R^4Si-CH_2CH_2-SiR^4Cl_2$, $Cl_3Si-CH_2-SiR^5Cl_2$, $R^6SiCl_3$ or $R^7SiHCl_2$ at 30° C. to 300° C., where, independently of one another, $R^1$ and $R^2$=H, $C_1$-$C_6$-alkyl or $C_2$-$C_6$-alkenyl and $R^4$, $R^5$, $R^6$ and $R^7$=$C_1$-$C_6$-alkyl or $C_2$-$C_6$-alkenyl wherein, if no other chlorosilanes are present, then the reaction of the oligosilazanes with $R^7SiHCl_2$, when $R^7$=$C_1$-$C_6$-alkyl, is excluded.

6. The process as claimed in claim 1, wherein, independently of one another, $R^1$ and $R^2$=H, $C_1$-$C_3$-alkyl or $C_2$-$C_3$-alkenyl and $R^3$, $R^4$, $R^5$, $R^6$ and $R^7$=$C_1$-$C_3$-alkyl or $C_2$-$C_3$-alkenyl.

7. The process as claimed in claim 1, wherein $R^1$=H $R^2$, $R^3$, $R^4$, $R^5$ and $R^7$=$CH_3$ and $R^6$=$CH_3$ or vinyl.

8. The process as claimed in claim 1, wherein the molar ratio of the chlorosilanes to the monomer unit of the oligosilazane is about 0.1:1 to 1.5:1.

9. The process as claimed in claim 1, wherein a temperature of 30° C. to 50° C. is maintained when adding the reactants together and the mixture is subsequently heated to 100° C. to 300° C.

10. A chlorine-containing silazane polymer of the formula (II)

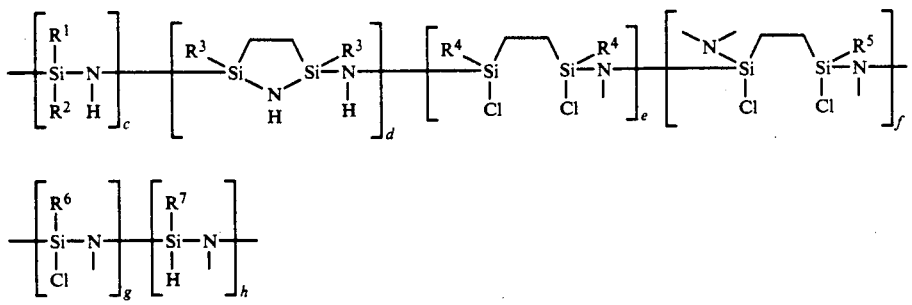

in which the free valencies of the nitrogen atoms are saturated by H atoms or silyl radicals $R^*SiX-N<$ ($X=H, Cl, N<, CH_2Cl_2Si\equiv$) and in which c, d, e, f, g and h denote the mole fractions of the individual structural units and, independently of one another, $R^1$ and $R^2 = H$, $C_1$-$C_6$-alkyl or $C_2$-$C_6$-alkenyl $R^4$, $R^5$, $R^6$ and $R^* = C_1$-$C_6$-alkyl or $C_2$-$C_6$-alkenyl $R^7 = C_1$-$C_6$-alkyl or $C_2$-$C_6$-alkenyl if at least one of the indices d, e, f and g > 0, and $R^7 = C_2$-$C_6$-alkenyl if $d=e=f=g=0$.

11. The chlorine-containing silazane polymer as claimed in claim 10, wherein, independently of one another, $R^1$ and $R^2 = H$, $C_1$-$C_3$-alkyl or $C_2$-$C_3$-alkenyl and $R^3$, $R^4$, $R^5$, $R^6$ and $R^7 = C_1$-$C_3$-alkyl or $C_2$-$C_3$-alkenyl.

12. The chlorine-containing silazane polymer as claimed in claim 10, wherein
$R^1 = H$
$R^2 = R^3 = R^4 = R^5 = R^7 = R^* = CH_3$ and
$R^6 = CH_3$ or vinyl.

13. A chlorine-containing silazane polymer which is obtained by the process as claimed in claim 1.

14. The process as claimed in claim 4, wherein, independently of one another, $R^1$ and $R^2 = H$, $C_1$—$C_3$—alkyl or $C_2$—$C_3$—alkenyl and
$R^3$, $R^4$, $R^5$, $R^6$ and $R^7 = C_1$-$C_3$-alkyl or $C_2$-$C_3$-alkenyl.

15. The process as claimed in claim 5, wherein, independently of one another, $R^1$ and $R^2 = H$, $C_1$-$C_3$-alkyl or $C_2$-$C_3$-alkenyl and
$R^3$, $R^4$, $R^5$, $R^6$ and $R^7 = C_1$-$C_3$-alkyl or $C_2$-$C_3$-alkenyl.

16. The process as claimed in claim 4, wherein
$R^1 = H$
$R^2$, $R^3$, $R^4$, $R^5$, $R^7 = CH_3$ and
$R^6 = CH_3$ or vinyl.

17. The process as claimed in claim 5, wherein
$R^1 = H$
$R^2$, $R^3$, $R^4$, $R^5$, $R^7 = CH_3$ and
$R^6 = CH_3$ or vinyl.

18. The process as claimed in claim 4, wherein the molar ratio of the chlorosilanes to the monomer unit of the oligosilazane is about 0.1:1 to 1.5:1.

19. The process as claimed in claim 5, wherein the molar ratio of the chlorosilanes to the monomer unit of the oligosilazane is about 0.1:1 to 1.5:1.

20. The process as claimed in claim 4, wherein a temperature of 30° C. to 50° C. is maintained when adding the reactants together and the mixture is subsequently heated to 100° C. to 300° C.

21. The process as claimed in claim 5, wherein a temperature of 30° C. to 50° C. is maintained when adding the reactants together and the mixture is subsequently heated to 100° C. to 300° C.

22. A chlorine-containing silazane polymer which is obtained by the process as claimed in claim 4.

23. A chlorine-containing silazane polymer which is obtained by the process as claimed in claim 5.

* * * * *